United States Patent [19]

Banker et al.

[11] 4,059,838

[45] Nov. 22, 1977

[54] CHROMA-PREFERENCE CONTROL FOR VIR AUTOMATIC OPERATION

[75] Inventors: Robert O. Banker, Portsmouth; Howard E. Holshouser, Suffolk, both of Va.

[73] Assignee: General Electric Company, Portsmouth, Va.

[21] Appl. No.: 726,182

[22] Filed: Sept. 24, 1976

[51] Int. Cl.² .......................................... H04N 9/535
[52] U.S. Cl. ...................................... 358/27; 358/10; 358/30; 358/40
[58] Field of Search ..................... 358/30, 28, 10, 27, 358/39, 40

[56] References Cited
U.S. PATENT DOCUMENTS

| | | | |
|---|---|---|---|
| 3,604,844 | 9/1971 | Ross | 358/27 X |
| 3,673,320 | 6/1972 | Carnt | 358/28 X |
| 3,950,780 | 4/1976 | Freestone | 358/28 |

Primary Examiner—Robert L. Richardson

[57] ABSTRACT

Viewer preference adjustment of saturation is realized in a VIR controlled color television receiver by provision of a closed loop control circuit exclusive of the RGB matrix. During the presence of the VIR signal a control signal is generated within the closed loop that controls the chrominance to luminance ratio of the chrominance and luminance signals applied to the RGB matrix and to the blue matrix contained within the closed loop. Adjustment of the level of either the luminance signal or the chrominance signal applied to the blue matrix affects the control signal which in turn adjusts said chrominance to luminance ratio to compensate and thereby brings about a shift in the levels of the red, green and blue signals outputted by the RGB matrix to change the saturation of the color picture.

7 Claims, 6 Drawing Figures

CHROMA-PREFERENCE CONTROL FOR VIR AUTOMATIC OPERATION

BACKGROUND OF THE INVENTION

The present invention relates to chroma gain control for color television receivers wherein the chroma gain setting is automatically obtained by use of a vertical interval reference (VIR) signal presently received on line 19 of each field of an NTSC video waveform.

Video information transmitted to a television receiver comprises a luminance signal portion and a chrominance signal portion. The chrominance signal portion comprises color difference signals which are obtained by demodulation of the chrominance signal. The color difference signals are in turn applied to a matrix amplifier where they are combined with the luminance signal to produce red, green and blue color signals for application to the color picture tube.

The ratio of the chrominance signal, from which the red, green and blue color signals to the picture tube are derived, to the luminance signal, used to derive these color signals, is known as the chrominance to luminance matrix ratio and this ratio determines the saturation or chroma gain of the receiver. As the ratio is increased, the resulting picture is more saturated and more intense with color and as the ratio is decreased, the resulting picture is less saturated and less intense with color.

Without the use of a VIR signal, the chrominance to luminance matrix ratio is typically selected by viewer adjustment of the gain of the chrominance signal amplifier in the color television receiver until the resulting picture reaches a visually pleasing degree of color saturation. However, with a VIR signal, the chrominance to luminance matrix ratio is set in accordance with the VIR signal. For example, in U.S. Pat. No. 3,950,780, by Harry T. Freestone, and assigned to the assignee of the present application, the gain setting of a television receiver chrominance signal amplifier is continually updated by a closed loop control circuit using VIR signal information.

In the Freestone patent, the control circuit compares a blue color signal derived from the chrominance reference portion of the VIR signal with a reference signal and adjusts the gain of the chrominance signal amplifier until the two signals are identical. The control circuit thereby insures that the saturation or chroma gain of the receiver is automatically set to the value established by the VIR signal regardless of variations due to aging of the receiver circuitry for processing the chrominance signal. Since the chrominance signal is adjusted in accordance with the VIR signal and since the VIR signal is subjected to the same program deviations experienced by the chrominance signal as transmitted, the VIR signal adjusts the receiver to compensate for such deviations.

A limitation in prior art VIR control circuits is that there is no provision by which a viewer can deviate the chrominance to luminance matrix ratio from that automatically set by the VIR signal. Some viewers may, for example, prefer greater color saturation than that provided by this chrominance to luminance matrix ratio. Other viewers may prefer less color saturation. The present invention envisions the utilization of a closed loop control circuit which allows for viewer selection of a preferred deviation from the color saturation determined by a VIR signal.

One method by which the preferred viewer deviation of color saturation might be considered to be achievable is to include an offset voltage to a closed loop control circuit, such as that taught by the Freestone patent, to adjust the gain of the chrominance signal amplifier a fixed amount from the setting determined under the control of the VIR signal. Unfortunately, such interjection of an offset voltage fails to maintain a preferred chrominance to luminance matrix ratio when luminance amplification is altered by adjustment of the receiver contrast control.

Another disadvantage of attempting to realize chroma gain preference control by means of an offset voltage in a control loop including the RGB matrix is that the blue color signal used in such prior art control loops for adjustment of chrominance signal amplifier gain is obtained from the blue drive of the color television receiver picture tube. This blue drive is a high level signal which contains high frequency components and thus poses radiation control problems. In addition, this blue drive in some cases is derived by matrixing of the luminance signal with color difference signals after the luminance signal is subjected to vertical blanking. As a consequence, erratic tolerance of receiver components creates a possibility that the blue drive will be lost during VIR signal transmission due to erroneous vertical blanking of line 19.

It is accordingly an object of the present invention to add viewer preference chroma gain deviation capability to a color television receiver wherein chroma gain is VIR controlled.

Another object of the present invention is to add viewer preferred chroma gain deviation to such a color television receiver which is independent of contrast control adjustment.

Still another object of the present invention is to add viewer preferred chroma gain without use of a high level blue drive and without risk of malfunction due to unintentional vertical blanking during line 19.

SUMMARY OF THE INVENTION

These and other objects are generally realized in the preferred embodiment of the invention, wherein the automatic chroma gain control circuit of this invention comprises a closed control loop operative during the presence of the VIR signal to matrix a sample of a luminance signal and a color difference signal derived from a chrominance signal in a low level signal environment to produce a color signal. The color signal during the chrominance reference portion of the VIR signal is compared to the color signal during a black level reference portion of the VIR signal to develop a control signal which is used to govern the chrominance to luminance matrix ratio until the color signals produced by the low level matrix during the two portions of the VIR signal are equal. Viewer preference is realized by selective control of either the sample of the luminance signal or the color difference signal before the low level matrixing of these signals. As a consequence of this selective control in a preferred embodiment, the gain of the chrominance signal amplifier is readjusted by the resulting closed loop control signal during VIR reception to reflect a viewer preferred chrominance to luminance matrix ratio which remains constant despite readjustment of the receiver contrast control.

Another advantage of the invention arises out of the use of an additional matrix in the closed loop VIR control circuit instead of the RGB matrix. Since the RGB matrix is not within the control loop, its amplification factors designed to match the NTSC signal with the phosphors of modern picture tubes do not need to be compensated for in order to realize $(B-Y) + Y = 0$ in the presence of the VIR signal. With the provision of an additional matrix for producing a blue signal when the VIR signal is present, the blue signal produced is free from the need to be applied to the picture tube simplifying the matrix construction and permitting the use of simple potentiometer voltage adjustment for the saturation preference control.

A better understanding of the present invention may be had from the following detailed description taken in conjunction with the drawings, in which.

DETAILED DESCRIPTION

Reference will now be made in detail to the present preferred embodiment of the invention, an example of which is illustrated in the accompanying drawings.

Figure 1:
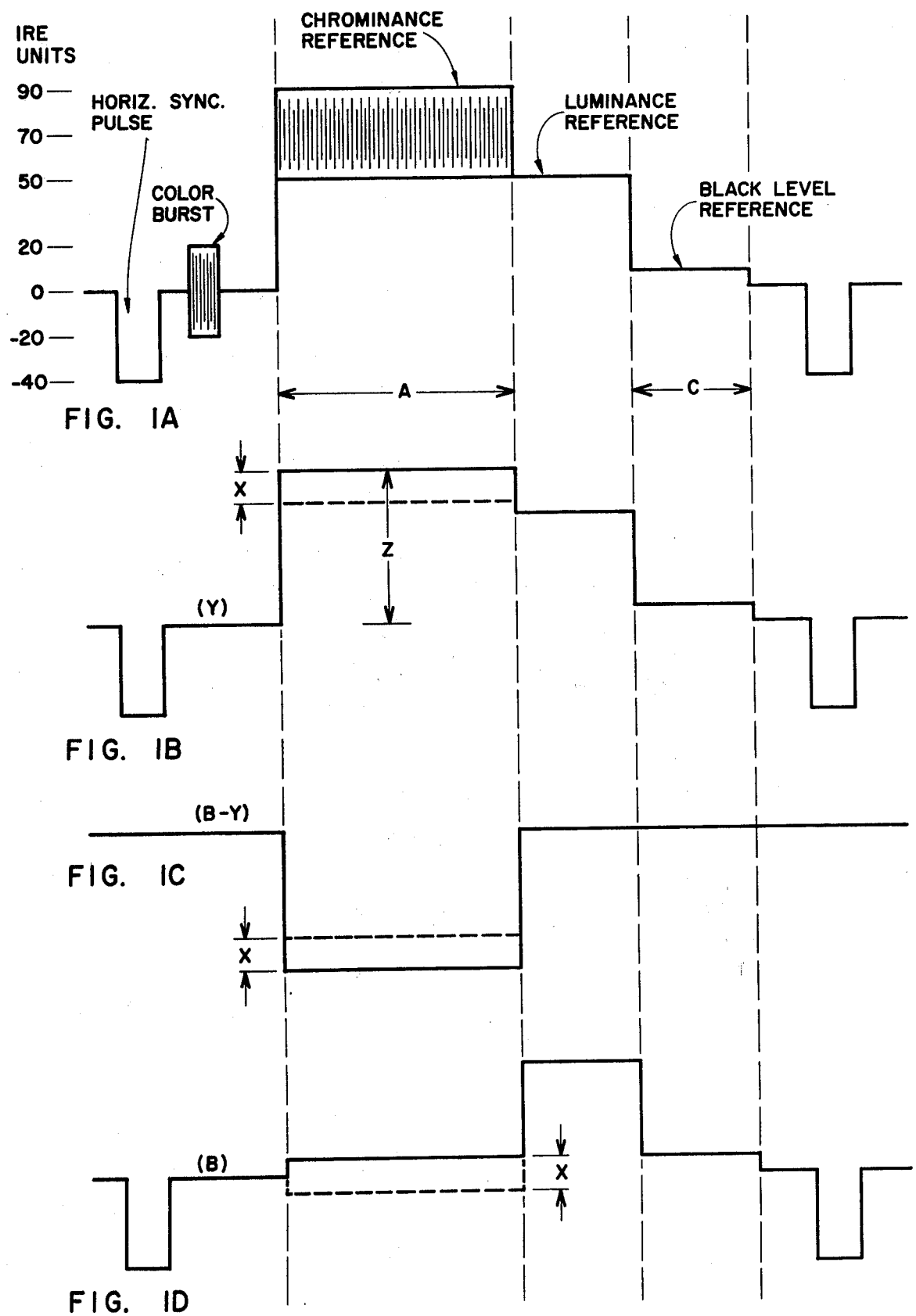
FIG. 1A is a representation of the waveform of a VIR signal.
FIG. 1B is the representation of the waveform of a VIR luminance signal.
FIG. 1C is a representation of the waveform of a VIR B-Y color difference signal.
FIG. 1D is a representation of the waveform of a matrixed Y and B-Y signal.

Referring to FIG. 1A, there is illustrated a format of a VIR signal for use of which line 19 in each video field has been reserved by the Federal Communications Commission. Line 19 is one of several unused horizontal lines of the vertical blanking interval of each video field. The VIR signal comprises a plurality of signal information portions following a horizontal synchronizing pulse. Specifically, a color burst signal is followed by a chrominance reference signal during time portion A, which is followed in turn by a luminance reference signal and finally by a black level reference signal during time portion C.

The form of these various portions is chosen to transmit useful color information. For example, the phase of the chrominance reference signal during time portion A is such, i.e., $-(B-Y)$, that a minimum output is realized from the R-Y color difference detector when the oscillator used to demodulate the chrominance signal in a color television receiver is set at the correct phase. Since the phase of this oscillator dictates the hue of the resultant color picture, the VIR signal can be used to automatically control the hue of the picture. Examples of circuits utilizing the VIR signal to control hue can be found in the above referred to Freestone patent and in co-pending patent application Serial No. 663,488, VIR Automatic Hue Control with Preference Capability, filed March 3, 1976 by Brown et al and assigned to the assignee of the present application.

The VIR signal also contains color saturation information, namely the chrominance to luminance ratio is such that if the phase of the chrominance reference portion is $-(B-Y)$ the blue signal B outputted by the RGB matrix of the color television receiver will be at a null if the chrominance to luminance matrix ratio of the receiver is set at the proper value. Since the value of the chrominance to luminance matrix ratio of the receiver dictates the saturation or chroma gain of the resultant color picture, the VIR signal can thereby be used to automatically control this aspect of the picture.

Use of the VIR signal to control saturation is more readily understood with references to FIGS. 1B – 1D. FIG. 1B represents the resulting luminance signal Y, derived in a color television receiver during receipt of the VIR signal. During the time portion prior to portion A the level of the luminance signal is at zero IRE units except for the period of the sync pulse (the sync pulse is at $-40$ IRE units). During time portion A the magnitude of the luminance signal is equal to the magnitude Z of the pedestal on which the chrominance reference signal is placed, namely 70 IRE units. The luminance signal assumes a value of 50 IRE units during the luminance reference portion of the VIR signal and, by definition, no luminance is present during the black level reference portion C (the luminance level during this portion is 7.5 IRE units).

FIG. 1C represents the resulting B-Y color difference signal derived in a color television receiver during the VIR signal by demodulation of the chrominance reference signal. For all portions of the VIR signal except during receipt of the chrominance reference signal in time portion A, there is no color information transmitted and thus there is no B-Y color signal.

FIG. 1D represents the resulting blue color signal derived from the matrixing of the B-Y and Y VIR signals. In theory, the addition or matrixing of the luminance signal Y and the color difference signal B-Y provides the blue color signal B which can be applied to the blue electrode of a color picture tube. In practice, due to the phosphors of the picture tube differing from that called for by the NTSC signal, the chrominance signal may not be demodulated to produce the precise color difference signal B-Y and matrixing of the actual color difference signal. Accordingly, as is set out more fully below, the present invention envisions the use of a separate matrix in addition to the RGB matrix. This separate matrix is active during the presence of the VIR signal and contains amplification factors to properly matrix the B-Y and Y signals.

Returning to FIG. 1D, the chrominance reference portion of the signal is of such phase and amplitude that a zero blue color signal can be realized during time portion A if the chrominance to luminance matrix ratio of the color television receiver is properly set (the level of the zero blue color signal is shown to be at 7.5 IRE units, i.e. the same level as the black level reference). Specifically, the chrominance reference signal has a B-Y color difference signal component equal to and of opposite polarity to the luminance signal Y during time portion A. With B-Y equal to Y, the blue signal, B-Y plus Y, equals zero. The blue signal must also equal zero when no color difference signal is present and when no luminance signal is present such as during the black level reference portion C of the VIR signal. Thus, when the blue signal during time portion A is the same as the blue signal during time portion C of the VIR signal, the chrominance to luminance matrix ratio of the receiver is properly set.

Figure 2:
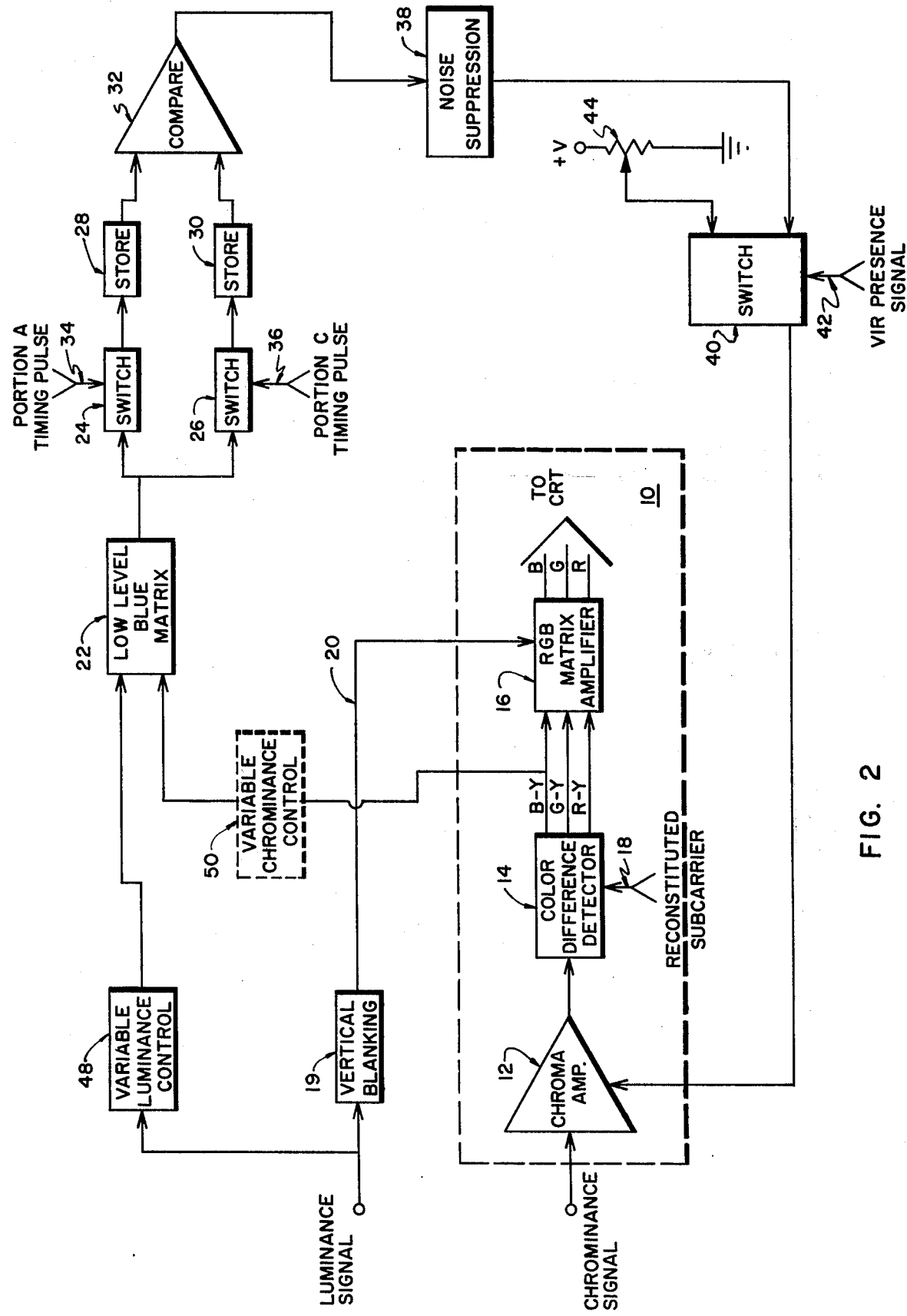
FIG. 2 is a block diagram of a portion of a color television receiver incorporating an automatic chroma gain control circuit in accordance with a preferred embodiment of the present invention.

Referring now to FIG. 2, a portion of a chrominance signal processing section of a color television receiver is indicated generally by the numeral 10. Chrominance signal processing section 10 includes a variable gain chrominance signal amplifier 12, color difference detector 14, and RGB matrix amplifier 16. Color difference detector 14 provides color difference signals R-Y, G-Y and B-Y to RGB matrix amplifier 16 in response to a chrominance signal received from amplifier 12 and a reconstituted subcarrier received at terminal 18. As is well known to those skilled in the art, a change in the phase of the reconstituted subcarrier is a means by which the hue setting of the receiver is adjusted and a change in the gain of amplifier 12 is a means by which the saturation or chroma gain of the receiver is adjusted.

The outputs of the color difference detector 14 and a luminance signal from line 20 are applied to RGB matrix amplifier 16 resulting in outputs of red R, green G and blue B color signals. These red, green, and blue color signals are then applied to a cathode ray tube (CRT) which is not shown. In some color television designs RGB matrix amplifier 16 may in fact be the cathode ray tube of the receiver.

In accordance with the invention, a sample of the luminance signal appearing on line 20 and the B-Y color difference signal from color difference detector 14 are fed into a control circuit which governs the gain of chrominance signal amplifier 12. The sample of the luminance signal is preferably taken from a point in the receiver after luminance drive control and before vertical blanking to assure receipt of the sample during VIR signal transmission despite possible erroneous blanking of line 19 of the video waveform. The B-Y color difference signal is selected only because the standard VIR signal is designed to impart color saturation information in the blue color signal. It is to be understood that the present invention envisions use of any color difference signal which results in providing similar color saturation information.

As embodied herein, the color control circuit includes a low level blue matrix 22 to provide a blue color signal from the addition of the sample luminance signal and the B-Y color difference signal. Blue matrix 22 is distinguished from RGB matrix amplifier 16 found in most color televisions receivers in that blue matrix 22 operates at a very low voltage level. Blue matrix 22 can, for example, be operated effectively in the 2 to 6 volt range. In addition, no provision need be made in blue matrix 22 to preserve high frequency components of the sample luminance signal, color difference signal or resulting blue color signal. Also, the amplification factor in blue matrix 22 may be adjusted so the unique relationship $(B-Y) + Y = 0$ is realized in the presence of the VIR signal. This is possible since blue matrix 22 is free from the restraints of the need to compensate for phosphor differences as is imposed upon the RGB matrix 16.

In accordance with the preferred embodiment of the present invention, the control circuit further includes switch 24, switch 26, storage circuit 28, storage circuit 30 and comparator 32. Switch 24 is responsive to a timing pulse during the chrominance reference portion A of the VIR signal at input terminal 34 to pass the blue color signal from matrix 22 to storage circuit 28. Switch 26 is responsive to a timing pulse during black level reference portion C of the VIR signal at input terminal 36 to pass the blue color signal to storage circuit 30. The blue color signal from time portion A in storage circuit 28 and the blue color signal from time portion C in storage circuit 30 are compared by comparator 32. Comparator 32 may comprise, for example one quarter of an LM 3900, a limited gain IC current comparing operational amplifier. Such an amplifier is not impedance dependent and therefore only minimally affects the time constant circuit found in the storage circuits 28 and 30.

The output of comparator 32, which may be called the VIR control voltage, is fed back in closed loop fashion to gain control chrominance signal amplifier 12 by a noise suppression circuit 28 and switch 40. The VIR control voltage, when applied to chrominance signal amplifier 12, adjusts the amplification of the chrominance signal applied to RGB matrix amplifier 16.

The noise suppression circuit 38 merely adds stability to the circuit and may comprise an emitter follower integrating circuit. Switch 40 allows the control loop to operate during receipt of a video wave which includes a VIR signal. A VIR signal is generated elsewhere within the television receiver and applied to switch 40 at terminal 42 to cause switch 40 to continuously pass the output of comparator 32 to chrominance signal amplifier 12. When a video signal is received which does not contain a VIR signal, no VIR presence signal appears in terminal 42 and switch 40 causes a DC voltage selected by a saturation control potentiometer 44 to pass to chrominance signal amplifier 12. Thus, potentiometer 44 acts as a manual color saturation control.

In accordance with a preferred embodiment of the invention, the sample of the luminance signal passes through a variable luminance control 48 before being coupled to low level blue matrix 22. Variable luminance control 48 comprises a saturation preference control which can be selectively adjusted by a viewer to control the level of the sample of the luminance signal delivered to low level blue matrix 22. The function of a preference control is explained below in connection with a discussion of the overall operation of the invention.

It is noted that a variable chrominance control 50 shown in dashed lines may be included in the path between the B-Y output of color difference detector 14 and matrix 22. Such a variable chrominance control may comprise the saturation preference control instead of or in addition to variable luminance control 48 in alternate embodiments of the present invention.

In operation of the invention, the ratio of the chrominance signal from chrominance amplifier 12 to RGB matrix amplifier 16 and the luminance signal on line 20 to RGB matrix amplifier 16 establishes the chrominance to luminance matrix ratio of the receiver. When no VIR signal is present, switch 40 allows DC voltage established by saturation control potentiometer 44 to control the gain of chrominance signal amplifier 12. Should a viewer desire greater color saturation, for example, saturation control potentiometer 44 is adjusted to increase the gain of amplifier 12 which in turn increases the chrominance to luminance matrix ratio. The setting of saturation control of potentiometer 44 is by manual operation by the viewer and is without aid of a VIR signal.

In a video waveform having a VIR signal, the chrominance reference portion of the VIR signal passes through chrominance signal amplifier 12 and is demodulated by color difference detector 14 to provide a B-Y color difference signal as illustrated in FIG. 1C. The sample of the VIR luminance signal illustrated in FIG. 1B passes through variable luminance control 48 to low level blue matrix 22 where the sample luminance signal is matrixed with the B-Y color difference signal to provide the blue color signal illustrated in FIG. 1D. During the portion A, switch 24 allows the blue color signal to be stored in storage circuit 28 and during time portion C, switch 26 allows the blue color signal to be stored in storage circuit 30.

As explained above, the VIR signal results in a zero blue color signal during the time portion A of the VIR signal when the receiver chrominance to luminance matrix ratio is properly set and the blue color signal is zero by definition during the black level reference portion C of the VIR signal. Accordingly, the output of comparator 32 should reflect equal signals in storage circuits 28 and 30. Any deviation in the signals in storage circuits 28 and 30 results in a control signal being produced by comparator 32 which adjusts the gain of the chrominance signal amplifier 12 until the deviation is eliminated. It is in this manner that the chrominance to luminance matrix ratio of the receiver is automatically maintained at the proper setting by the VIR signal.

Figure 3:
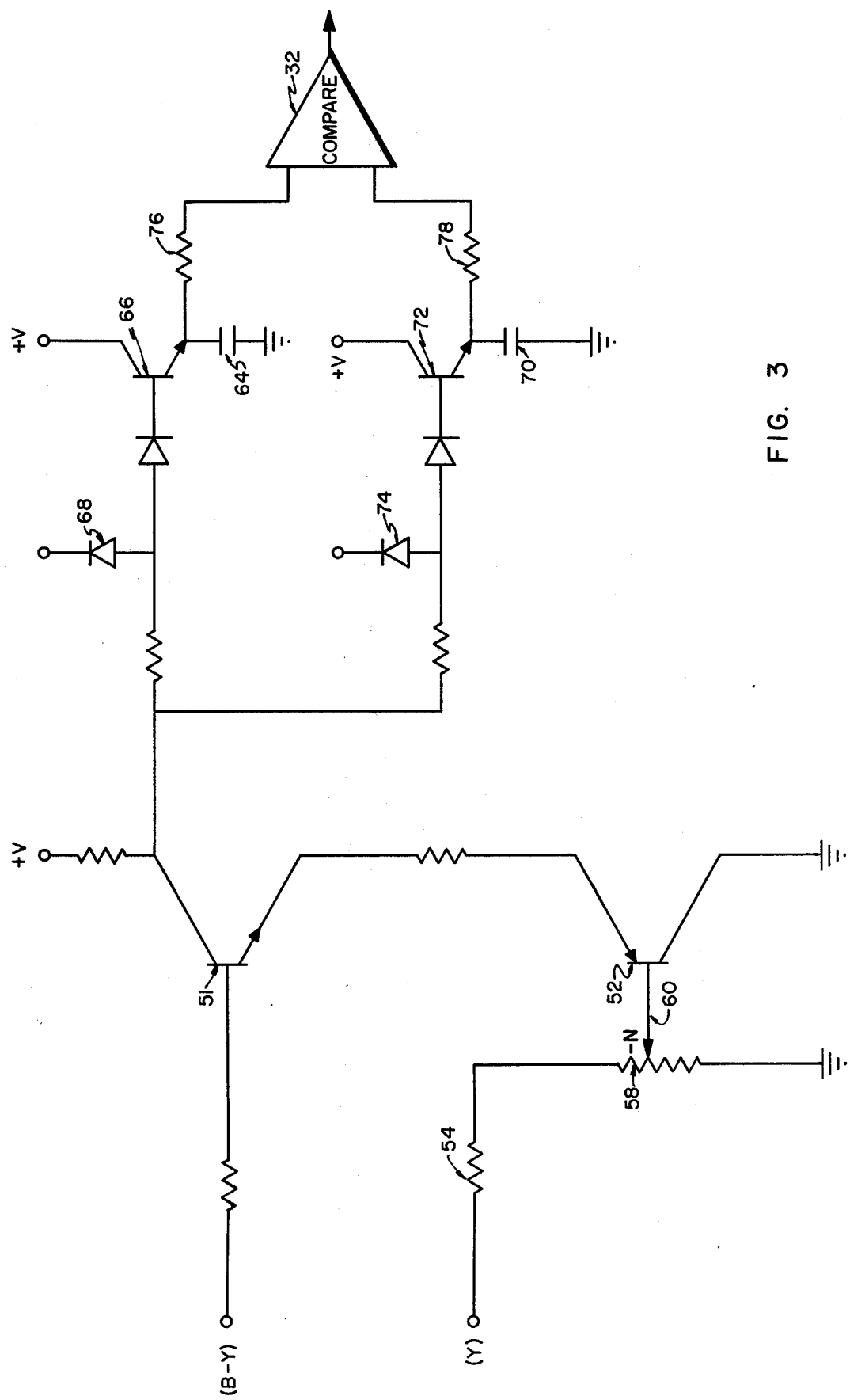
FIG. 3 is a circuit diagram of one embodiment of a portion of the automatic chroma gain control circuit disclosed in FIG. 2.

Referring now to FIG. 3, there is shown a specific example of a portion of the automatic chroma gain control circuit shown in FIG. 2. In FIG. 3 a specific example of a low level blue matrix is shown to include an emitter follower arrangement of transistors 51 and 52. The base of transistor 51 receives a B-Y color difference signal from the color difference detector 14 in FIG. 2 and the base of transistor 52 receives a sample of the luminance signal from one example of a variable luminance attenuator comprising potentiometer 58 in series with resistor 54. Sweep arm 60 of potentiometer 58 is shown positioned at a suitable preference control adjustment, which differs from a neutral position N where only the VIR signal controls saturation. At any deviation from neutral point N saturation is determined by both the offset voltage generated by the potentiometer 58 and the VIR signal.

A resulting blue color signal from the collector of transistor 51 charges storage capacitor 64 when transistor 66 is turned on by a timing pulse across diode 68 during chrominance time portion A of the VIR signal. The blue color signal from transistor 51 charges storage capacitor 70 when transistor 72 is turned on by a timing pulse across diode 74 during black level reference portion C. The discharge time constant determined by capacitors 64 and 70 and respective resistors 76 and 78 is such that the discharge of capacitors 64 and 70 into comparator 32 to produce the VIR control signal from comparator 32 extends throughout each field of the video waveform.

Viewer preference saturation control is achieved by a preference potentiometer control 58. At the neutral point N, the sample of the luminance signal applied to potentiometer 58 is attenuated the same amount the B-Y signal applied to the base of transistor 51 is attenuated by the color television circuitry so that the desired ratio of B-Y/Y = 1 as determined by the VIR signal is obtained. When the preference control 58 is set either above or below the neutral point, the attenuation of the luminance sample is varied from that of the B-Y signal. In such case the chrominance to luminance matrix ratio must be varied from the ratio dictated by the VIR signal if the blue color signals in storage circuits 28 and 30 are to remain equal.

For illustrative purposes, reference is once again made to FIG. 1B-1D. In FIG. 1B, the luminance signal level is shown attenuated an amount X from the luminance signal level when preference control 58 is set at the neutral point. The resultant blue signal at the collector of transistor 51 is illustrated by the dotted line in FIG. 1D during time portion A. Thus, the blue color signal during time portion A momentarily fails to equal the blue color signal during time portion C. This inequality causes the control signal output from comparator 32 to adjust the gain of chrominance amplifier 12 until the B-Y color difference signal illustrated in FIG. 1C is reduced an amount X. While the attenuation of the sample luminance signal applied to blue matrix 22 has no affect on the luminance signal applied to RGB matrix amplifier 16, varying the gain of chrominance amplifier 12 to compensate for this attenuation does affect the chrominance signal applied to RGB matrix amplifier 16 and hence affects the chrominance to luminance matrix ratio and resulting saturation or chroma gain of the receiver.

It can be seen from the foregoing that viewer preference adjustment of saturation away from that set by the VIR signal is initiated within the low level blue matrix closed control loop. The compensation for the preference adjustment within this loop is realized at the RGB matrix which is outside the loop. In this manner the chrominance to luminance ratio within the low level loop is maintained constant permitting chrominance tracking of luminance while a preferential change is realized in the chrominance/luminance ratio as applied to the picture tube from the RGB matrix.

It should be noted that the selective control provided by preference control 58 need not necessarily be applied only to the sample luminance signal. Selective control of the B-Y color difference signal coupled to blue matrix 22 alone or in combination with control of the sample luminance signal would also be acceptable provided the resultant adjustment caused a momentary unbalance between the two signals. In addition, variation of the chrominance to luminance matrix ratio need not necessarily be affected only by varying the amplitude of the chrominance signal. Varying the amplitude of the luminance signal coupled to the RGB matrix amplifier 16 alone or in combination with amplification of the chrominance signal will also result in an acceptable means for varying the chrominance to luminance matrix ratio of the color television receiver.

Furthermore, while FIG. 2 shows the B-Y signal taken from color difference detector 14 and applied to low level blue matrix 22, it is also possible to have a separate color difference detector for the low level control loop. Such a separate color difference detector, placed for example between chroma amplifier 12 and variable chrominance control 50, could provide the advantage of different angle detection than that utilized by the detector 14 which is tailored to meet the particular phosphors of the CRT.

While a particular embodiment of the present invention has been shown and described, it will of course be obvious to one skilled in the art that certain advantages and modifications may be effected without departing from the spirit of the invention, and accordingly, it is intended that the scope of the invention not be determined by the foregoing examples but only by the scope of the appended claims.

What is claimed and desired to be secured by Letters Patent of the United States is:

1. In a color television receiver, an automatic saturation control circuit responsive to a VIR signal comprising:
   means for providing a luminance signal,
   means for providing a color difference signal from a chrominance signal, control means responsive to both said luminance signal and said color difference signal during receipt of said VIR signal for governing the chrominance to luminance matrix ratio of said receiver, and means to enable a viewer to preferentially control the level of at least one of said luminance and said color difference signals to vary said chrominance to luminance matrix ratio.

2. The automatic saturation control circuit recited in claim 1 wherein said control means includes:

low level matrix means for generating a color signal in response to said luminance signal and said color difference signal as level controlled, means for generating a control signal in response to a comparison of said color signal during a first portion of said VIR signal and said color signal during a second portion of said VIR signal, and means for varying the level of said chrominance signal in response to said control signal.

3. In a color television receiver responsive to a VIR signal, an automatic chroma control circuit comprising:

means for providing a luminance signal, means for providing color difference signals from a chrominance signal, matrix means responsive to said color difference signals and to said luminance signal to provide color signals for the color picture of said television receiver, means for providing a sample of said luminance signal, a closed loop video control circuit responsive to said sample luminance signal and to a selected one of said color difference signals during the presence of said VIR signal to provide a control signal, said closed loop video control circuit including means responsive to said control signal to adjust the ratio of said chrominance signal to said luminance signal, such that the ratio of said selected color difference signal to said sample luminance signal remains in accordance with said VIR signal, preference means within said closed loop video control circuit for adjusting the level of at least one of said sample luminance and selected color difference signals such that said control signals shifts the ratio of said chrominance signal to said luminance signal to maintain the ratio of said selected color difference signal to said sample luminance signal thereby causing a saturation shift in said color signals.

4. The invention recited in claim 3 wherein said closed loop video control circuit includes second matrix means responsive to said selected color difference signal and to said sample luminance signal to produce a selected color signal, and means for generating said control signal in response to a comparison of said selected color signal during first and second portions of said VIR signal.

5. The invention recited in claim 4 wherein said preference means comprises luminance attenuating means for preferentially attenuating the level of said sample luminance signal and said means responsive to said control signal comprises gain control means for adjusting the amplitude of said chrominance signal.

6. The invention recited in claim 4 wherein said preference means comprises level control means for controlling the level of said selected color difference signal as applied to said second matrix means.

7. The invention recited in claim 6 wherein said sample luminance signal is derived prior to vertical blanking of said luminance signal.

* * * * *